June 22, 1926.
H. S. JANDUS
BUMPER
Filed August 20, 1924
1,589,856
2 Sheets-Sheet 1
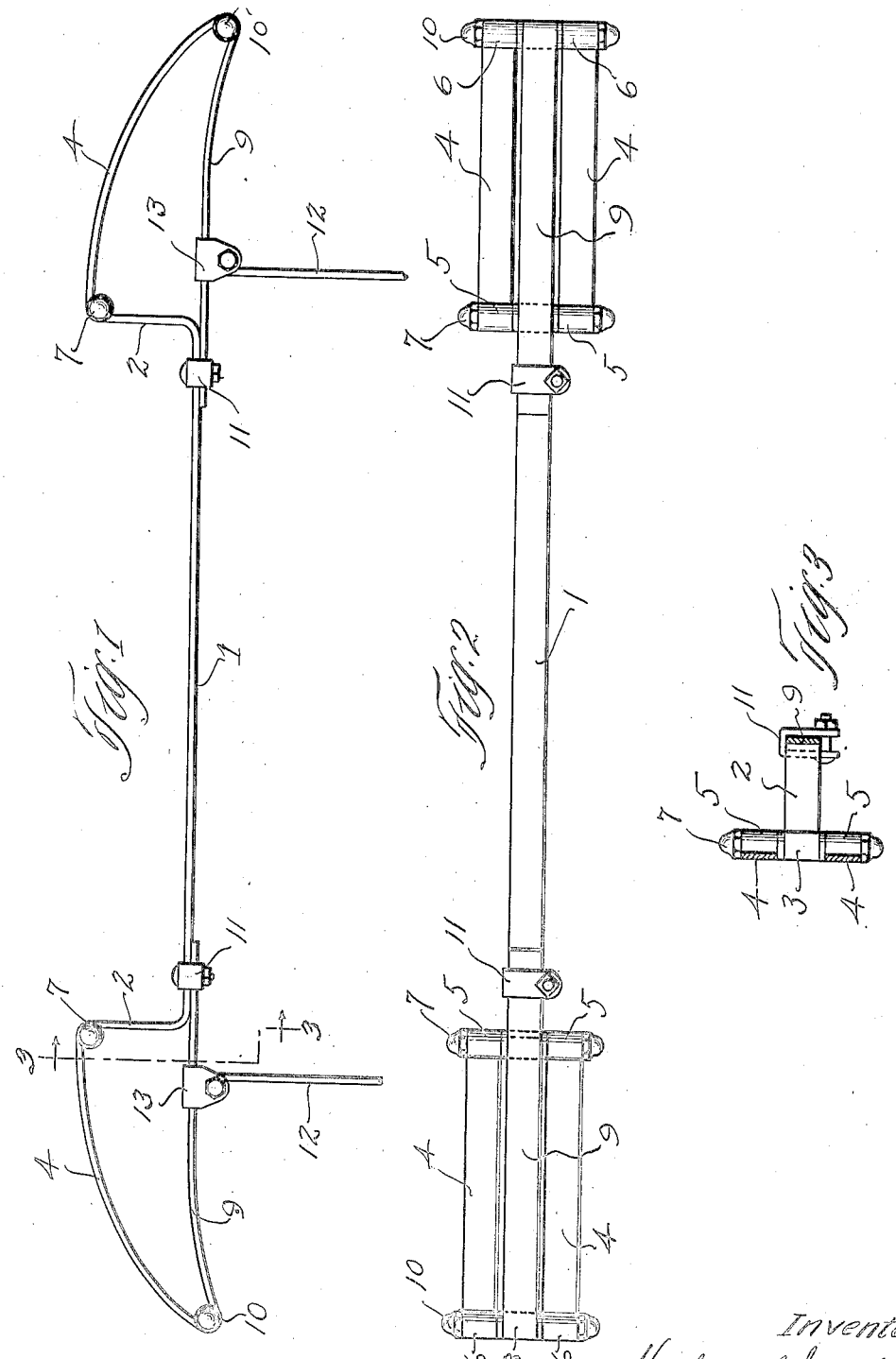

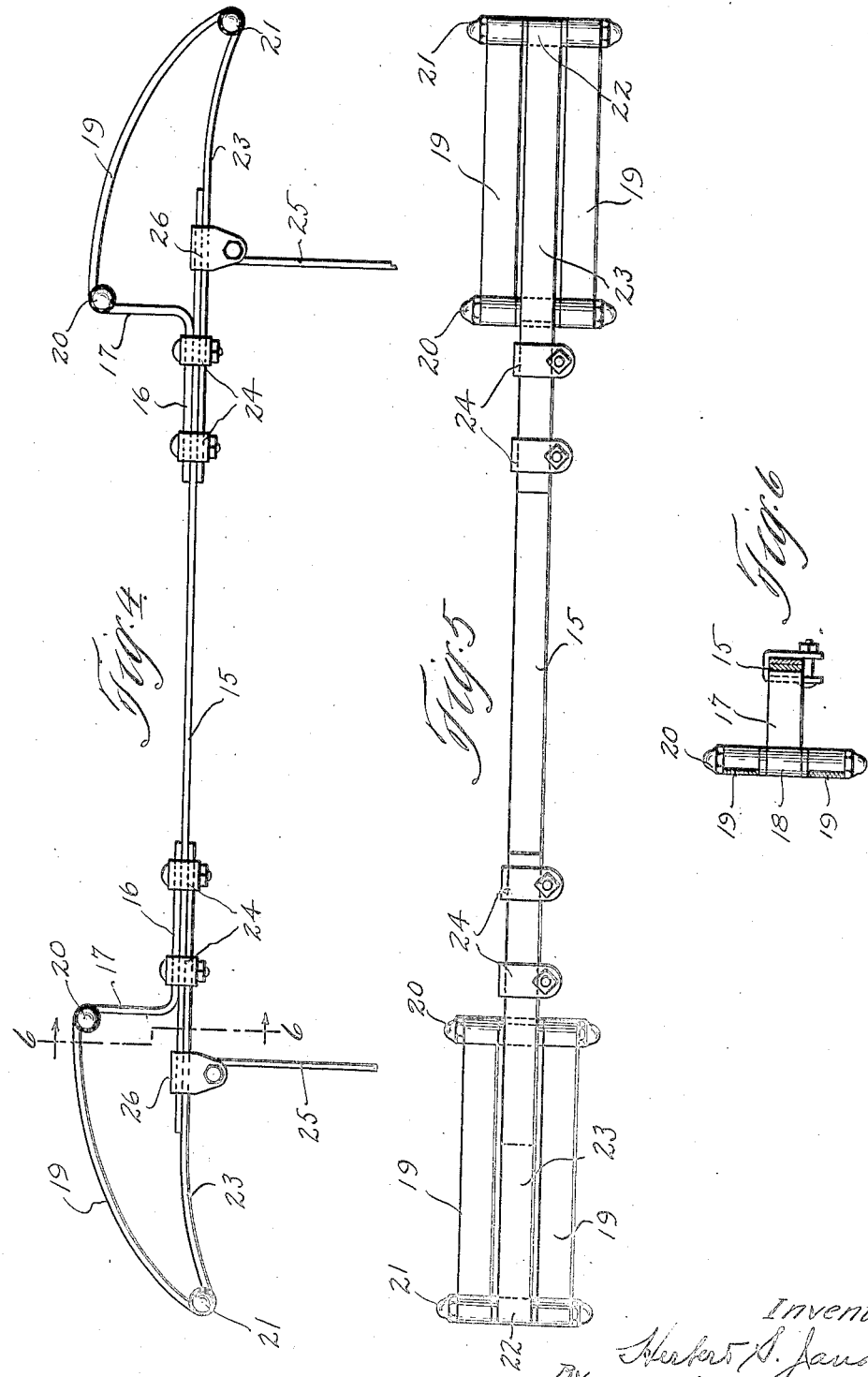

Patented June 22, 1926.

1,589,856

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed August 20, 1924. Serial No. 733,136.

This invention relates to bumpers, and more particularly to combined bumpers and fender-guards, adapted to be applied to the rear ends of automobiles and similar vehicles.

The invention disclosed herein is embodied in a bumper and fender-guard wherein a space or pocket is provided between the body of the bumper and the fender-guard portions thereof, for the reception of one or more spare tires.

It is the general purpose and object of the invention to provide a combined bumper and fender-guard of the foregoing type which shall be simple in construction, inexpensive to manufacture and highly efficient in resisting impacts, and one wherein the fender-guard portions of the bumper may be conveniently folded against the central section of the bumper during shipment thereby materially reducing the overall length of the shipping package.

I accomplish the foregoing objects in and through the construction shown in the drawings accompanying and forming part of this application, and wherein Fig. 1 is a plan view of a bumper embodying my invention; Fig. 2 is an elevation of said bumper but with the attaching arms omitted; Fig. 3 is a sectional view corresponding to the line 3—3 of Fig. 1; Fig. 4 is a plan view of a modified form of construction; Fig. 5 is an elevation of such modified form; and Fig. 6 is a sectional view corresponding to the line 6—6 of Fig. 4.

Describing the various parts by reference characters and referring to Figs. 1—3, 1 denotes a bar of resilient spring steel which is of sufficient length to extend substantially across the rear of the vehicle frame and which has the end portions thereof turned rearwardly as indicated at 2, and each end, terminating in an eye 3.

Cooperating with the end portions of the bar 1 are upper and lower spring-plate bars 4. Each of these bars is provided at its inner end with an eye 5 and at its outer end with an eye 6. The eyes 5 at the inner ends of the bars 4 register with the corresponding eye 3 of the bar 1 and are secured thereto by means of a bolt 7. The bars 4 are curved outwardly and forwardly and are disposed substantially parallel with the bar 1. The eyes 6 at the outer end of the bars 4 register with the corresponding eye 8 of a bar 9 and are fastened thereto by means of a bolt 10. Each bar 9 extends rearwardly and inwardly and is fastened at its inner end to the bar 1 by means of an inverted U shaped clamp 11. Suitable attaching arms 12 are each connected by means of a clamp 13 to their corresponding bar 9 and these arms are adapted to be fastened to the vehicle frame or other part and serve to support the bumper.

The construction described above is relatively cheap to manufacture and provides a space or pocket for the reception of one or more tires, such space being defined by the rearwardly turned end portions 2 of the bar 1.

By loosening the bolts 10 so as to release the outer ends of the bars 4 from the outer ends of the bars 9, the fender-guard sections may be swung about the bolts 7 as pivots and folded into the space between the rearwardly turned ends of the bar 1. As the arms 12 are not connected to the bars 9 until the bumper is applied to a vehicle, the bars 9 may be slid inwardly along the bar 1 by first removing the clamps 13 or loosening their clamping pivot bolts as well as loosening the clamps 11. This permits the bumper to be packed for shipment with a length substantially equal to the length of the bar 1.

In the modified form of construction shown in Figs. 4–6, 15 denotes a bar of resilient spring steel which extends slightly beyond the side members of the vehicle frame. Secured to this bar, inwardly from each end, is a bar 16 having a rearwardly turned portion 17 which terminates in an eye 18.

Cooperating with the end portions of each bar 16 are upper and lower spring-plate bars 19. Each of these bars is provided with an eye at each end as previously described in connection with the bars 4. The inner ends of the bars 19 are connected by means of a bolt 20 with the corresponding eye 18 and the outer ends of these bars are connected by means of a bolt 21 with the corresponding eye 22 of a bar 23. Each bar 23 is curved slightly rearwardly, and extends inwardly in contact with the bar 15. The bars 15, 16 and 23 are secured together by means of inverted U shaped clamps 24. Suitable attaching arms 25 are each connected by means of a clamp 26 to the bars 23 and 15, and these arms are adapted to be fastened to the vehicle to support the structure.

With a bumper structure as above described, a pocket or space for one or more spare tires is provided between the rearwardly extending arms 17, and the structure as a whole is relatively cheap to manufacture and efficient in resisting impacts.

By loosening the clamps 24 and 26, the fender-guard sections may be slid inwardly until the bars 19 contact with the ends of bar 15 thereby enabling the bumper to be shipped in a package whose overall length does not greatly exceed the overall length of bar 15.

Having thus described my invention, what I claim is:

1. A bumper comprising a bar adapted to extend across the rear of a vehicle, rearwardly extending arms projecting from said bar and defining a space or pocket for one or more tires, an upper and a lower bar secured at their ends to, and respectively above and below, the corresponding end of each of said rearwardly projecting arms, the said upper and lower bars projecting outwardly and forwardly from such ends, and a second bar connected to the outer ends of said upper and lower bars and to the first mentioned bar.

2. A bumper comprising a bar adapted to extend across the rear of a vehicle, rearwardly extending arms projecting from said bar and defining a space or pocket for one or more tires, a pair of bars connected to the end of each of said rearwardly extending arms, a bar connecting the outer ends of each pair of bars with the first mentioned bar, and means for attaching said bumper to the vehicle.

3. A bumper comprising a bar adapted to extend across the rear of a vehicle, rearwardly extending arms projecting from said bar and defining a space or pocket for one or more tires, a fender-guard connected to each rearwardly extending arm, and a second bar connecting the outer end of each fender-guard with the first mentioned bar.

4. A bumper comprising a bar adapted to extend across the rear of a vehicle and having its end portions turned rearwardly, fender-guards connected to said rearwardly turned ends, a second bar connecting the outer ends of said fender-guards with the first mentioned bar, and means for attaching said bumper to the vehicle.

5. A bumper comprising a bar adapted to extend across the rear of a vehicle and having its end portions turned rearwardly, fender-guards connected to said rearwardly turned ends, said fender-guards being curved outwardly and forwardly, and a second bar connected to the outer end of each fender-guard, said second bar being curved rearwardly and inwardly and connected to the first mentioned bar.

6. A bumper comprising a bar adapted to extend across the rear of a vehicle, arms connected with the end portions of said bar and extending rearwardly, fender-guards connected with said rearwardly extending arms, and a second bar connected with the outer end of each fender-guard, said second bars being connected to the first mentioned bar.

7. A bumper comprising a bar adapted to extend across the rear of the vehicle, arms connected with the end portions of said bar and extending rearwardly, a pair of looped fender guards each connected at its inner end to the rear end of the corresponding arm and extending outwardly and forwardly therefrom and each having a bar extending inwardly from the outer end thereof, and means securing the inner end of each of the last mentioned bars to the first mentioned bar.

8. A bumper comprising a bar adapted to extend across the rear of a vehicle, arms connected with the end portions of said bar and extending rearwardly therefrom, a fender guard comprising a bar connected at its inner end to each arm and extending outwardly therefrom, and an arm connected with the outer end of each of the last mentioned bars and extending inwardly and movably connected to the first mentioned bar.

9. A bumper comprising a bar adapted to extend across the rear of the vehicle, a pair of looped fender guards each extending outwardly from the said bar and each having a bar extending inwardly from the outer end thereof, and means movably connecting the inner end of each of the last mentioned bars to the first mentioned bar.

In testimony whereof, I hereunto affix my signature.

HERBERT S. JANDUS.